United States Patent [19]
Kojima

[11] 4,127,793
[45] Nov. 28, 1978

[54] DEVICE FOR MAINTAINING A STOPPED VEHICLE IN BRAKED CONDITION

[76] Inventor: Saburo Kojima, 3-198, Yazumachi, Narashino-shi, Chiba-ken, Japan

[21] Appl. No.: 817,333

[22] Filed: Jul. 20, 1977

[30] Foreign Application Priority Data

Jul. 22, 1976 [JP] Japan .................................. 51-86523

[51] Int. Cl.² ............................................. B60Q 1/14
[52] U.S. Cl. ..................................... 315/80; 315/122; 340/69
[58] Field of Search ....................... 315/80, 77; 340/69

[56] References Cited

U.S. PATENT DOCUMENTS

| | | | |
|---|---|---|---|
| 2,669,704 | 2/1954 | Hollins | 315/80 X |
| 3,281,786 | 10/1966 | Leichsenring | 315/80 X |

Primary Examiner—Alfred E. Smith
Assistant Examiner—Charles F. Roberts
Attorney, Agent, or Firm—Kurt Kelman

[57] ABSTRACT

The device disclosed herein has a construction such that when a vehicle in motion is brought to a stop by depression of a foot brake, a lock engaging means thereof functions to lock a brake operating rod with the foot brake kept in the depressed state. When the headlights of the moving vehicle are turned on, the actuation of the lock engaging means automatically causes the headlights to be turned off and small lamps (parking lights) to be turned on instead. When the lock engaging means is released in preparation for starting the vehicle, the brake operating rod is released and the headlights are turned on again and the parking lights are turned off.

12 Claims, 6 Drawing Figures

DEVICE FOR MAINTAINING A STOPPED VEHICLE IN BRAKED CONDITION

BACKGROUND OF THE INVENTION

This invention relates to a device for maintaining a stopped vehicle of any of various types in braked condition, which device permits the foot brake of the vehicle to be selectively locked in a fully depressed state to be assumed in consequence of the application of foot pressure. When the headlights of the moving vehicle are turned on as they would be at night, the device of this invention causes the headlights to be turned off in consequence of the locking of the foot brake after the vehicle has been stopped.

Various vehicles such as, for example, passenger cars and cargo trucks which are designed for travel on public roads normally make use of a foot brake as the means for stopping their motion. Whenever a vehicle is stopped even temporarily at an intersection to wait for a traffic signal to change or elsewhere on account of traffic congestion, for example, the vehicle is required in principle to retain the state of perfect motionlessness such as by application of a hand brake until the time of restart, so as to preclude the possibility of the vehicle gradually gathering momentum because of an inclination of the road surface at the place of stop or to protect the passengers of the vehicle from the shock of an accidental rearend collision by some other vehicle. In the first place, the operation of the hand brake is a troublesome chore. Particularly where the driver of the vehicle is compelled to stop the vehicle at frequent intervals such as when the vehicle is travelling in an urban district or when the vehicle is involved in traffic congestion, he is apt to find the frequent application of the hand brake quite troublesome. Thus, the driver more often than not acquires a habit of trying to keep the vehicle in the state of perfect stop by means of the foot brake even after the vehicle has come to a stop.

The restraining or arresting force which the foot brake exerts against the motion of wheels is undoubtedly stronger than that produced by the hand brake. In order for this force to be manifested fully, it is necessary that the pedal of the foot brake should be depressed with ample foot pressure. Since it is not very easy for any driver to keep the pedal depressed under such a powerful foot pressure throughout a stop of the vehicle, many a driver makes it a rule to lessen his foot pressure after his vehicle has come to a stop. In the case of a vehicle provided with an automatic transmission of the clutchless type, for example, the foot pressure applied is barely enough to keep the vehicle from moving by itself. In the case of a vehicle using an ordinary manually operated transmission, the foot pressure is totally released. In an extreme case, the driver simply rests his foot on the pedal of the foot brake, placing full reliance upon the levelness of the road surface at the place of a stop. Such scenes are not necessarily unfamiliar nowadays. Such being the case, there is no way of ensuring perfect safety of the vehicle during a stop. It is no exaggeration to say that the presence of such vehicles can be extremely dangerous to other vehicles stopped or passing nearby.

The inventor, taking notice of this dangerous state of affairs, already invented and disclosed a device which enables a foot brake to be locked in its fully depressed state by direct manual operation of a mechanical system. The foot brake thus kept in the locked state brings about the same effect as is obtained by having the foot brake depressed with sufficient foot pressure. Nevertheless, since in this locking device, the work of locking is accomplished by the movement of the driver's hand or arm in much the same way as in the case of the hand brake mentioned above, the locking itself can hardly be carried out simply by the movement of a finger tip.

With regard to the system of illuminating lamps, use of headlights is an indispensable requirement for the vehicle in motion at night. While the vehicle is kept at a stop, however, it is desirable to have the headlights turned off so as to give the battery a rest and help it to elongate its service life. From the standpoint of security, namely in the sense of taking precautions against the possibility of blinding drivers of oncoming vehicles while the vehicle is stopped at an intersection, for example, the headlights should be kept turned off during the period of stop.

SUMMARY OF THE INVENTION

An object of the present invention is to provide a device for maintaining a stopped vehicle in braked condition, which device enables the foot brake to be instantaneously locked safely by the simple movement of a finger tip into the same state as is obtained by thoroughly depressing the foot brake by foot pressure.

Another object of the invention is to provide a device for maintaining a stopped vehicle in braked condition, which device, adapted to function selectively when the vehicle is using its headlights while in motion, enables the foot brake to be safely locked into the same state as is obtained by fully depressing the foot brake and, at the same time, causes the headlights to be turned off and small lamps (parking lights) to be turned on instead.

To accomplish the objects described above according to the present invention, there is provided a device for maintaining a stopped vehicle in braked condition, which device comprises a foot brake provided with lock-engaging means, locking means adapted to come into engagement with the lock-engaging means while the foot brake is in its depressed position and thereby allow the foot brake to be retained in said depressed position, lock-actuating means serving to set the locking means selectively into its locked position or released position and headlight-switching means incorporated in appropriate portions of the circuit for the headlights and adapted to open the circuit upon detection of the fact that the locking means is in its locked position or close the circuit upon detection of the fact that the locking means is in its released position.

As described above, the device of the present invention enables the foot brake of a vehicle to be locked safely under the same condition as obtained when the foot brake is depressed by the foot pressure. The operation of the locking mechanism thereof, though manual nominally, can be instantaneously performed by the simple movement of a finger tip without any toil. When the moving vehicle is using its headlights, the headlights are automatically turned off and switched to auxiliary lamps (such as parking lights) each time that the vehicle is brought to a stop by depression of the foot brake and the locking mechanism of the present invention is actuated.

The other objects and characteristic features of the present invention will become apparent from the detailed description to be given hereinbelow with reference to the attached drawings. For the convenience's sake, the headlights will be referred to as "large lamps"

and other auxiliary lamps including parking lights referred to as "small lamps" hereinafter.

DESCRIPTION OF THE PREFERRED EMBODIMENTS

Figure 1:
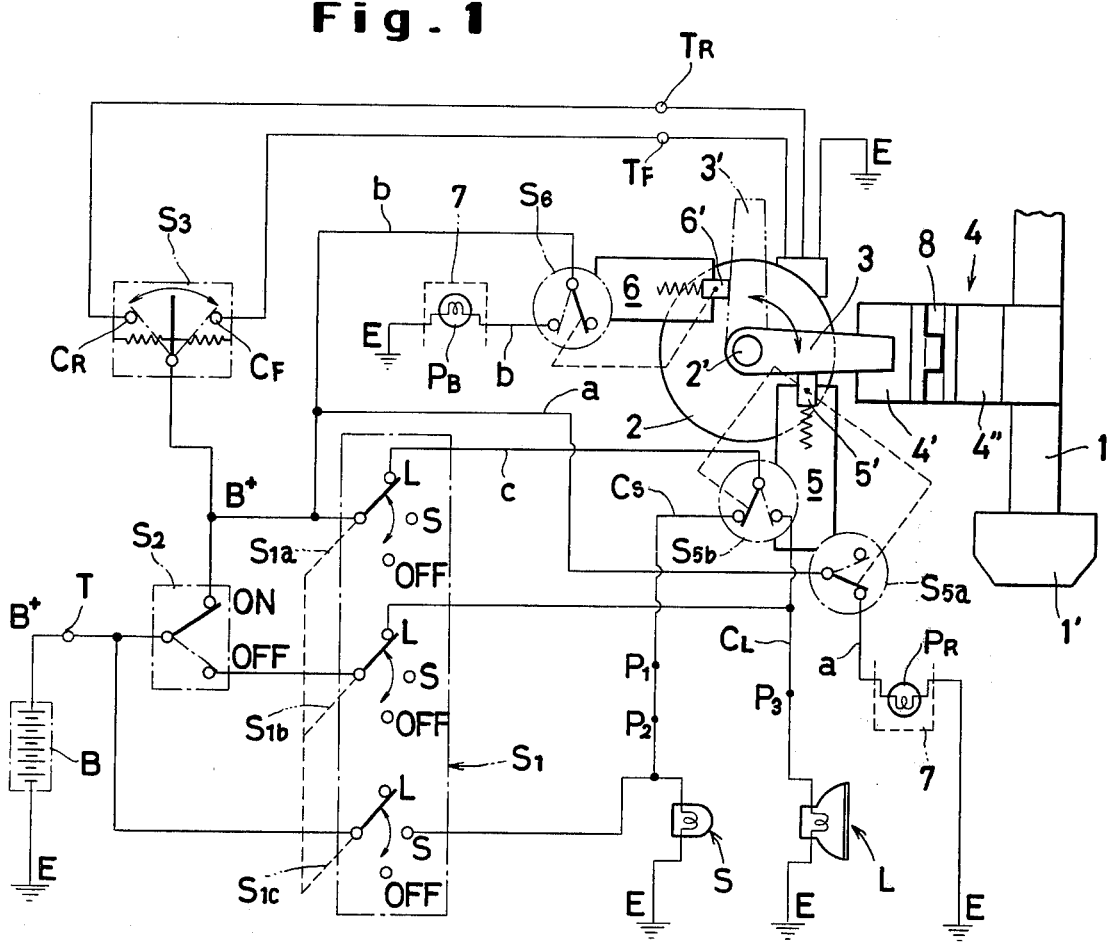
FIG. 1 is a circuit diagram illustrating one preferred embodiment of the device for maintaining a stopped vehicle in braked condition according to the present invention.
Figure 2:
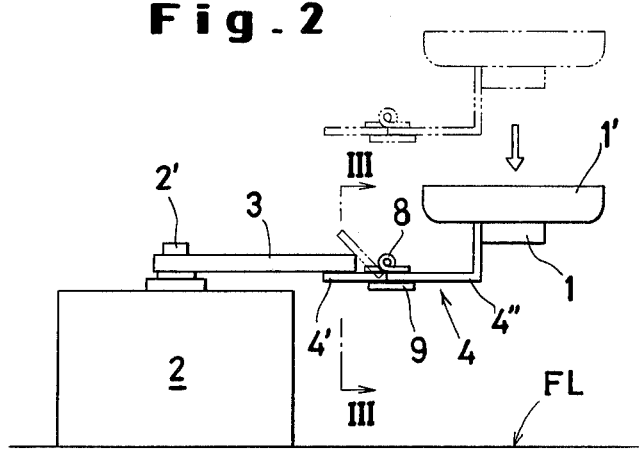
FIG. 2 is an explanatory diagram illustrating the operation of the device of this invention for maintaining a stopped vehicle in braked condition.

With reference to FIGS. 1 and 2, the foot brake locking mechanism, namely, the locking mechanism for the pedal lever 1 of a foot brake will be described. In the case of the illustrated preferred embodiment, the operating member for the locking mechanism is a reversibly rotary electric motor 2. To the rotary shaft 2' of this motor 2 is fastened an arm 3 which serves as the locking means. By means of the electric circuit to be described afterward, the motor 2 imparts a rotary motion to the arm 3 and thereby permits the arm 3 to be moved either to a locked position indicated in a solid line or to a released position indicated in a dotted line. For the purpose of distinction, the rotation of the arm 3 toward the locked position is regarded as that in a positive direction and is indicated by the symbol F in the drawing and the rotation in the reverse direction is indicated by the symbol R.

The pedal lever 1 serving to actuate the foot brake is kept in its upper position when the vehicle is in motion, namely while the foot brake is not in its depressed state (indicated in the drawing as "position during motion"). The pedal lever 1 is caused to assume its lower position when the vehicle's driver depresses the foot brake to bring the vehicle to a stop or to slow down the vehicle (indicated in the drawing as "position in depressed state").

To the pedal lever 1 of the foot brake is attached an L-shaped arm receiving plate 4 which extends in the direction of the motor 2 attached fast to the floor surface FL of the vehicle as clearly shown in FIG. 2. Said arm receiving plate 4 is provided at its leading end with an arm receiving unit 4' which is disposed substantially parallel to the floor surface.

When the driver depresses the brake pedal with his foot pressure and subsequently turns the lock-release selection switch toward the "lock" side, the motor is rotated in the direction F and the arm 3 fastened to the rotary shaft 2' is mounted on the upper surface of the arm receiving unit 4' being held in the depressed state. The arm receiving unit 4' consequently, is pushed down in the direction of preventing the pedal lever 1 from being returned to the releasing direction (toward the position during motion). Once this state is assumed, the brake of the vehicle is retained in its locked state if the driver removes his foot pressure from the pedal 1'.

FIG. 2 depicts the operation of the locking mechanism described above. Desirably the pedal lever is not locked at a position to be assumed when it is depressed to the greatest possible depth but at a position to be assumed when the pedal falls slightly short of reaching the greatest possible depth of depression, at which position the brake is amply capable of retaining the vehicle in the state of a perfect stop. The reason for this particular locking position is as follows:

The driver does not actuate the locking means until he depresses the brake pedal by foot pressure. If the engagement between the arm 3 and the arm receiving unit 4' is not established unless the brake pedal is depressed to the greatest possible depth, then a slight shortage of the foot pressure or a slight change in the position of the pedal depression due to vibration caused in the vehicle body may lead to the possibility that, while the arm 3 is rotating toward the arm receiving unit 4', the arm 3 will not completely reach the upper surface of the arm receiving unit 4' but collide into the lateral edge of the arm receiving unit or slide on the lower surface thereof. For this reason, the locking position of the foot brake is desired to be such that the arm will reach the upper surface of the arm receiving unit without fail even when the operator starts the rotation of the arm 3 by the actuation of the selective switch after he has depressed the brake pedal with a foot pressure normally required for the purpose of bringing the vehicle to a stop. Desirably this locking position is fixed so that after the brake pedal has moved away slightly from its depressed position in the releasing direction in consequence of the removal of the foot pressure from the pedal, the arm will prevent further return of the pedal. In this case, the relative positions of the arm and the arm receiving unit can be adjusted more advantageously by properly regulating the height of the arm with respect to the floor surface FL. This is because the position at which the pedal of the foot brake is given the greatest depth of depression is generally variable with the degree to which the brake shoes have worn out up to a given time. This variation can be satisfactorily coped with by rendering the position of the arm 3 relative to the motor shaft 2' adjustable in the axial direction of said shaft such as by means of a screw.

In the present preferred embodiment, the arm 3 is adapted as illustrated in FIG. 1 to produce a reciprocating rotary motion within the angular range of 90° between the locked position and the released position. This angle of rotation is purely a matter of choice from the standpoint of design. What is essential is the fact that the arm 3 is safely engaged with the lock-engaging means at its locked position and it is released from the engagement at its released position.

Figure 3:
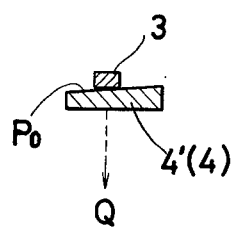
FIG. 3 is a cross-sectional view taken along the line III—III of FIG. 2.

The thoroughness of the braking effect produced by the foot brake in its locked state can be enhanced, for example, by giving to the arm receiving plate 4, particularly to the arm receiving unit 4', a cross-sectional shape which, as illustrated in FIG. 3, is tapered so as to gradually gain in wall thickness in the direction of the arrow from the released position to the locked position of the arm 3. When the arm receiving unit 4' is given this cross section, it is pushed downwardly in the direction of the arrow Q in proportion as the arm 3 is rotated in a horizontal level from the point $P_0$ at which it reaches the upper surface of the arm receiving unit 4' to the point at which it finally settles to a rest. Thus, the arm receiving unit 4' can be moved downwardly, i.e. in the direction of adding to the braking effect and consequently improving the reliability of the braking system as a whole.

Alternatively, improved safety may be obtained by giving the arm receiving unit 4' a similarly tapered cross section instead of the arm or by having the arm receiving plate 4 fastened in an inclined state.

Now the electric circuit system including a function for the control of illumination facilities will be described. It should be noted in this connection that FIG. 1 shows only a diagram of wire distributions required for the illumination lamps involved in the present invention.

A vehicle incorporating the circuit system illustrated in FIG. 1 represents one preferred embodiment of the device of this invention wherein the illumination is switched from large lamps to small lamps when the foot brake is locked and from small lamps to large lamps when the foot brake is released.

The illumination lamp switch $S_1$ is of a type similar to switches used heretofore in vehicles of this sort. Only for the convenience of the circuit system to be used in the device of this invention, this circuit happens to consist of three-way ganged switches $S_{1a}$, $S_{1b}$, and $S_{1c}$. Thus the operation of the illumination lamp switching is substantially the same as the established practice. What is important is the fact that the circuit should possess a structure such that only when the driver has selected to use the large lamps, the circuit permits the large lamps to be automatically turned off and the small lamps to be turned on instead each time that the vehicle is brought to a stop and the locking mechanism of the foot brake is actuated.

The circuit system of the device of this invention is generally mounted on a vehicle, as illustrated in FIG. 1, through the medium of the input terminal T of the power source and the voltage $B^+$ from the output terminal side of the battery B of which one end descends to an earth E is forwarded to the switch contact side of the selective switch $S_2$ designed to entrust the driver with proper selection between the operation and non-operation of the brake locking circuit.

While the selection switch $S_2$ is kept in its OFF position as indicated by a dotted line, the illumination lamps on the vehicle can be manually switched on and off as the driver pleases in entirely the same manner as with the conventional switch system. Of the illumination lamp switch $S_1$, the circuit switches $S_{1b}$ and $S_{1c}$ are responsible for the selection. The slider side terminal of the circuit switch $S_{1b}$ is connected to the OFF side stationary terminal of the selective switch $S_2$ and the slider side terminal of the circuit switch $S_{1c}$ to the switch side terminal of the selective switch $S_2$ respectively. Therefore, when the driver sets the changeover switch $S_1$ to its OFF position, the two circuit switches $S_{1b}$, $S_{1c}$ are both set to their OFF positions. When the driver selects the small lamps (in the diagram, the contacts or terminals for the switches involved in the selection of small lamps S are indicated by the symbol S and those involved in the selection or large lamps L are indicated by the symbol L), the small lamps S alone are given the voltage $B^+$ through the circuit switch $S_{1c}$ and are turned on consequently (with the S terminal of the switch $S_{1b}$ isolated electrically). When the driver selects the large lamps L, the switch $S_{1c}$ has its electric continuity to the small lamps S broken and consequently causes the small lamps S to be turned off and the switch $S_{1b}$ has its sliding element brought into contact with the contact L and, because the selective switch $S_2$ in this case is kept to its OFF side, causes the large lamps L to be turned on.

When the selective switch $S_2$ is set to its ON side, the voltage $B^+$ is forwarded to the switching element of the lock release selective switch $S_3$. The reversibly rotary motor 2 used as the means for operating the locking means is possessed of an input terminal $T_F$ capable of causing a normal rotation F (rotation toward the locked position) and an input terminal $T_R$ capable of causing a reverse rotation R (rotation toward the released position) respectively with respect to the earth terminal E. These terminals are connected respectively to the locking side contact $C_F$ and the releasing side contact $C_R$ of the lock-release selective switch $S_3$. This lock-release selective switch $S_3$ is a switch of the automatic resetting center-off type. When the operator keeps the switching element of this switch turned with his finger toward either of the two contact sides and subsequently lifts the finger from the switching element, the switch is automatically reset to its neutral position by dint of bias means such as a spring.

In the case of the illustrated preferred embodiment, the motor 2 is adapted so as to cause the arm 3 to produce a reciprocating rotary motion within the range of an angle of 90° between the released position and the locked position. At these terminal positions, there are disposed limit switches 5, 6 which serve concurrently as stoppers as described in further detail afterward. Upon arrival at these final positions, the rotary motions of the arm 3 are respectively stopped by the tongues 5', 6' adapted to produce a switching operation of the built-in switches of said limit switches 5, 6.

In case where the arm 3 is kept on the limit switch 6 side, if the brake locking mechanism is to be operated after the pedal 1' of the foot brake has been depressed by the driver, the driver is required to turn the switching element of the lock-release selective switch $S_3$ toward the lock CF side. Consequently, the switching element of the switch $S_3$ makes contact with the terminal CF side to establish an electric continuity from the battery B to the terminal TF of the motor 2. The motor, therefore, is rotated in its normal direction and the arm 3 fastened to the shaft 2' of the motor is consequently rotated. When the arm 3 has reached the upper surface of the arm receiving unit 4', it comes into contact with the tongue 5' of the limit switch mechanism 5, causing the rotation of the arm 3 to be brought to a stop. With the assumption of this state, the locking of the foot brake is completed as already described. When the driver subsequently releases his finger from the switch $S_3$, the switching element of the selective switch $S_3$ automatically returns to its neutral position. To release the foot brake from the locked state, the driver is required to set the lock-release selective switch $S_3$ to its release side. As a consequence, the motor is rotated in the reverse direction and the arm 3 is consequently rotated and released from contact with the arm receiving unit 4'. This reverse rotation of the arm 3 is stopped when the arm 3 is brought into contact with the tongue 6' of the limit switch 6.

The limit switch 5 incorporates therein switches $S_{5a}$, $S_{5b}$ and limit switch 6 incorporates therein a switch $S_6$. The switches $S_{5a}$ and $S_6$ function to selectively light up the pilot lamps $P_R$, $P_B$ of the indicators 7 which are provided for the purpose of enabling the driver to tell, through visual inspection, the present status of the aforementioned locking mechanism. In the indicators 7, there are provided a pilot lamp $P_R$ serving as an indication that the foot brake is now in its locked state and a pilot lamp $P_B$ (desirably adapted to issue a light of a color different from the color of the light from the lamp $P_R$) serving as an indication that the foot brake is now in its released state. When the locking means is actuated as shown in FIG. 1, the tongue 5' is pushed into the switch mechanism by the rotation of the arm 3 and, in consequence of the gradual insertion of the tongue 5', the switch $S_{5a}$ incorporated in the switch is turned and set to its ON position, causing the pilot lamp $P_R$ to be lit up with the voltage B+ forwarded via the line a. The pilot lamp $P_R$ thus lit tells the driver that the foot brake is now held in its locked state. While this state continues, the other pilot lamp $P_B$ is kept turned off. When the locked state of the foot brake is released and the arm 3 is consequently allowed to return to the position indicated by the numeral 3', the tongue 5' is automatically thrust out to turn off the switch $S_{5a}$ and, at the same time, the tongue 6' is pushed in by the returning arm 3 to set the switch $S_6$ to its ON position, causing the pilot lamp $P_B$ to be lit by way of an indication that the foot brake is now in the released state. That is to say, whenever the driver sets the lock-release selective switch operating, he keeps his finger on the switch and, only after having usually confirmed that the one pilot lamp which has so far been lit has gone out and the other pilot lamp is turned on instead by way of an indication that the foot brake has assumed the state the latter pilot lamp is known to indicate, he can release his finger from the lock-release selective switch with absolutely no fear for misoperation. Thus, the pilot lamps guarantee perfect safety of operation of the foot brake.

Actually the lock-release switch can be accomplished in a matter of about 0.5 second of the rotation of the motor. The effective functions of these pilot lamps can be obtained, therefore, by using only the switch $S_{5a}$, for example, instead of the switches designed for exclusive use with the pilot lamps to connect the lamp $P_B$ to the terminal on the release side of the switch $S_{5a}$. As a possible consequence, the lamp $P_R$ may be turned off at the moment that the tongue 5' departs from the arm and the lamp $P_B$ indicative of the released state may be immediately turned on because of a changeover of the switch $S_{5a}$. This possible phenomenon matters little because the switching is accomplished in an extremely short period of time as mentioned above. In this case, a block or some other suitable means is provided to serve the purpose of stopping the rotary motion the arm produces during its return to the released position. The limit switches need not be made to function concurrently as stoppers. Instead, independent stoppers may be formed with blocks or some other suitable means as mentioned above. Then, the tongue 5' intended to actuate the switch may be adapted to move with lightness enough for the sole purpose of the detection of the position of the arm and avoid exposure to the impact generated when a stop is given to the arm in rotary motion. Consequently, the service life of the switch mechanism can be elongated.

Now, the switch between the large lamps and the small lamps in consequence of the lock-release selection of the foot brake will be described.

When the driver sets the changeover switch $S_2$ to its OFF position, the brake-locking mechanism wll not function. If the main switch $S_1$ is set to its OFF position, neither the small lamps nor the large lamps can be turned on. If the switch is set to its S position, then the small lamps can be turned on. If it is set to its L position, only the large lamps can be turned on.

If the changeover switch $S_2$ is set to its ON position and the main switch $S_1$ to its L position, the voltage B+ is forwarded through the changeover switch $S_2$ and the switch $S_{1a}$ to the switch $S_{5b}$.

The switch $S_{5b}$ is built in the aforementioned limit switch 5 and is caused by the mechanical motion of the tongue 5' to switch the contacts. When the foot brake-locking mechanism is kept in its released state, therefore, the switch $S_{5b}$ is held on the line CL side and only the large lamps L are turned on. When the driver sets the selective switch $S_3$ to the CF side and the brake-locking mechanism is actuated, the rotation of the arm 3 causes a switch of the contacts of the microswitch 5, with the result that the switch $S_{5b}$ built in said microswitch is switched toward the line $C_s$ side and the large lamps are turned off and the small lamps turned on.

It is apparent from the description given above that if the main switch $S_2$ is kept in its ON position and the driver sets the illumination lamp switch toward the "large lamp" side to drive the vehicle at night, the large lamps are turned on. If the driver, after having brought the vehicle to a stop even temporarily, locks the foot brake securely in its depressed state by use of the foot brake-locking mechanism, then the large lamps are automatically turned off and the small lamps turned on instead. Then, when the foot brake is released from its locked state in preparation for starting the vehicle from the state of perfect stop, the large lamps are automatically turned on. Thus, the operator of the vehicle is relieved not only from the troublesome chore of pulling the side brake lever but also from the trouble of switching the illumination lamps after and before each stop of the vehicle.

As regards the actual distribution of switches, the selective switch $S_2$ which is not operated very frequently may be disposed at a less conspicuous position in the vicinity of the driver's seat. In contrast, the lock-release selective switch $S_3$ for the operation on the foot brake and the illumination lamp switch $S_1$ should be located where they can be operated readily by the driver. The indicators 7 may be located where they can readily be seen by the driver.

Any driver may commit an error in the operation of his vehicle such as by inadvertently actuating the lock-release selective switch $S_3$ and, without taking notice of this inadvertence, trying to stop the vehicle's motion by depressing the foot brake. The behavior of the device of the present invention in connection with such an erroneous operation will be described. As is clear from FIGS. 1 and 2, the arm receiving unit 4' serving as the lock-engaging means is connected through the medium of a hinge 8 to the base 4" at which the arm receiving plate 4 is fastened to the brake pedal lever 1. When the selective switch $S_3$ is operated, the arm 3 assumes its position under the arm receiving unit 4'. If the foot brake is depressed at this time, the arm receiving unit 4' collides into the arm 3. The resulting impact only causes the leading end of the arm receiving unit to rotate around the hinge 8 as a fulcrum. Consequently, the brake pedal can be further depressed to a position where an ample braking effect is obtained. Thus, the erroneous operation leads to no danger.

To preclude the possibility that, while the arm receiving unit 4' is held beneath the arm 3, said arm receiving unit 4' will move downwardly despite the presence of hinge means, the present preferred embodiment has control plates 9 provided one each on the lower surfaces of the arm receiving unit 4' and the base 4".

These control plates 9 may be fastened onto the base 4" sides with the aid of suitable fastening means such as, for example, welding or a combination of bolts and nuts.

When the arm receiving unit 4' and the base 4" both have sufficient thickness, the phenomenon that the arm receiving unit 4' tends to be bent downwardly in the boundary surface in which they come into mutual contact may be prevented. In such a case, provision of said control plates is not found necessary.

In any event, so far as the operation is performed normally, the arm receiving unit 4' is held down by the arm 3 with the foot brake in the locked state as illustrated in FIG. 2. Because of this positional relationship coupled with the functions such as of control plates 9, the pedal lever 1 of the foot brake is retained in perfectly locked state even after the driver's foot pressure is removed from the pedal.

In the preferred embodiment described above, the operating means used for actuating the locking means is constructed as shown in FIG. 4 (A) of a pinion 10 provided at the base of the arm 3 and a rack 11 meshed with said pinion 10 so that the arm 3 will be rotated by causing the rack 11 to be selectively moved in either of the two lateral directions. As the means for imparting a motion to the rack 11, there are used solenoids $mg_1$, $mg_2$. FIG. 4 (A) illustrates said operating means in a state having the foot brake locked, in which state the locking solenoid $mg_1$ has magnetically attracted the operating rod 12 made such as of steel and formed so as to extend from the rear side of the rack through the space interventing between the two solenoids. From this locked state the operating means is relieved by releasing the solenoid $mg_1$ from excitation and instead energizing the releasing solenoid $mg_2$ for thereby causing the operating rod 12 to be attracted to the right with reference to the position illustrated in the diagram, with the arm 3 rotated clockwise until perfect departure from the arm receiving unit 4' by virtue of the engagement between the rack and the pinion. The preferred embodiment has been described as having the rack 11 disposed inside a guide member 13 and the operating rod 12 protruding through a guide opening 14. The mechanism involving the operation of the rack and the operating rod may be effected by some other construction insorfar as the same function can be fulfilled.

Figure 4A:
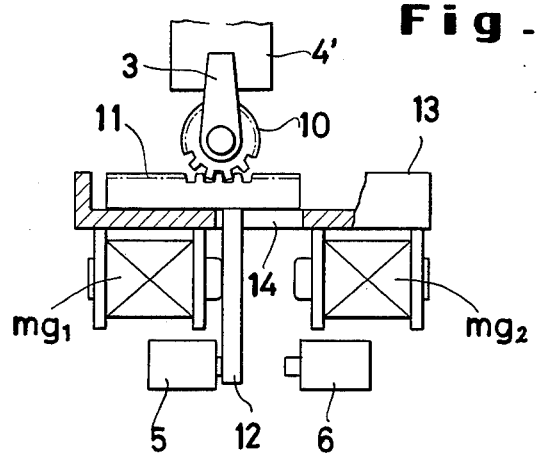
FIG. 4 is an explanatory diagram illustrating another preferred embodiment of the locking mechanism of the device of the present invention for maintaining a stopped vehicle in braked condition.
Figure 4B:
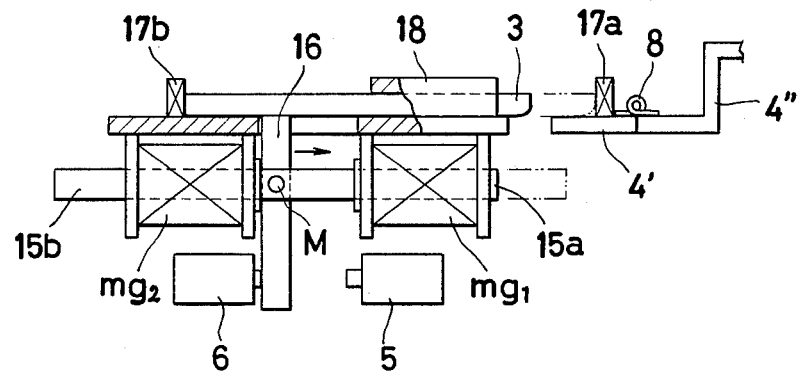

FIG. 4 (B) illustrates another preferred embodiment of the operating means, wherein the arm 3 serving as locking means is adapted to produce a linear motion in the direction of the arm supporting unit 4'. In this operating means, a locking solenoid $mg_1$ and a releasing solenoid $mg_2$ are disposed at a suitable height from the floor surface and separated from each other by a suitable distance in the direction in which the arm 3 is allowed to extend and respective operating rods 15a, 15b of said solenoids are connected thereto. From the intersecting point M, an operating rod 16 for the locking means is perpendicularly extended upwardly, with the leading end thereof fastened to the arm 3. In the case of the illustrated preferred embodiment, the arm 3 is depicted as being attracted by the releasing solenoid $mg_2$ to the left with reference to the position in the diagram. In the case of a solenoid system so desigend that the arm 3 is caused by the function of the locking solenoid $mg_1$ to move to the locking position and press down the arm receiving unit 4', there is required a circuit such that the locking solenoid $mg_1$ is connected to the terminal $T_F$ for normal rotation of the motor and the releasing solenoid $mg_2$ to the terminal $T_R$ for reverse rotation of the motor respectively as indicated in FIG. 1, whereby said motion of the arm 3 is readily accomplished by means of the center-off switch $S_3$. As a safeguard against the possibility that, after release of the excitation of the solenoid system, a vibration or some other external shock exerted upon the vehicle will cause the arm 3 to loosen itself from its fixed position, i.e., either released position or locked position, there are provided, on the locking side, magnet means 17a such as a permanent magnet or an electric magnet having a slightly smaller capacity for excitation which is disposed on the arm receiving unit 4' and, on the releasing side, magnet means 17b of a similar description which is disposed at one point of a guide member 18, which is described in further detail afterward, so that said magnet means 17b is collided into by the side of the arm 3 opposite the other side thereof which collides into said magnetizing means 17a. These magnet means sufficiently fulfil their functions if they are powerful enough to protect the arm against said loosing from the fixed position. They must not be more powerful than the magnetizing power with which the solenoid $mg_1$ or $mg_2$ is actuated, or they will interfere with the effective function of the solenoid system. These magnet means, particularly the one for the locking side, may otherwise be disposed on the arm receiving plate or arm receiving unit. In the preferred embodiment of FIG. 4(B), since the force which the arm receiving unit 4' exerts upwardly on the arm 3 is quite strong, there may desirably be provided a guide member 18, for example, which is adapted to fulfil a dual purpose of guiding the arm 3 and keeping the arm 3 pushed downwardly. This also applies to the preferred embodiment described earlier. If the resilience of the brake pedal which is acting on the arm 3 in the locked position happens to be quite strong, then necessary counterbalance may advantageously be obtained by having a suitable opposing member disposed on the vehicle side so as to remain in contact with the upper surface of the arm kept in the locked position. When the inventor personally manufactured devices of the constructions of FIG. 2 and FIG. 4(A) and tested them, the arms 3 in both the trial devices were demonstrated to resist amply the resilient forces exhibited by their respective brake pedal levers.

In the preferred embodiment of FIG. 4(B), the operating rod 16 for the locking means is connected to the two solenoid operating rods 15a, 15b. Instead of these solenoid operating rods, there may be incorporated a mechanism which, as illustrated in FIG. 4(A), effects necessary attraction of the operating rod of the locking means solely by the agency of magnetism. Alternatively, solenoid means of the construction of FIG. 4(A) may be provided with operating rods adapted to be moved into or out of the solenoids by their own excitation and release from excitation and may have connected thereto an operating rod for the rack as illustrated in FIG. 4(B).

Yet another preferred embodiment of the operating means for the locking means may be of a construction such that the solenoid system illustrated in FIG. 4(B) is disposed perpendicularly to the direction of the length of the arm receiving unit 4' and the arm is extended parallelly with the arm receiving unit so that the reciprocating motion between the locking and releasing positions will be produced in a direction parallel with the direction in which the two solenoides are disposed. For added simplicity of the construction, the solenoid operating rods themselves may be utilized as the locking means so that necessary locking of the brake is obtained by causing said operating rods to come into engagement with the lock-engaging means when said operating rods thrust out of the solenoids.

In the preferred embodiments illustrated in FIGS. 4(A) and 4(B), the limit switches serving to turn on or off the large lamps are only required to be disposed at positions such that the tongues 5' thereof are collided into by the operating rod 12 for the rack or the operating rod 16 for the locking means when said operating rod has reached the locked position. Similarly with respect to the limit switches 6 serving to turn on or off the pilot lamps $P_B$, it suffices to have the limit swtiches disposed at positions such that they are collided into by the operating rod 12 (or 16) when said operating rod has reached the released position. What is important is the fact that the circuits serving to forward power supply to the large lamps are connected to the power source and designed so that the limit switches 5 function to turn off the large lamps when the locking means reaches the locked position and turn on the large lamps when the locking means reaches the released position.

Figure 5:
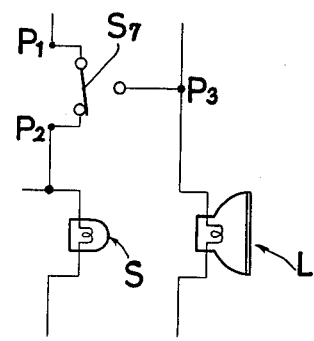
FIG. 5 is a circuit diagram illustrating still another embodiment having the circuit of FIG. 1 patially modified.

When the brake locking function is effectuated, the large lamps are automatically turned off and the small lamps are turned on instead. If the device of this invention is desired to permit the large lamps to be selectively turned on during the presence of said brake locking function, the circuit formed by embracing the points $P_1$, $P_2$ and $P_3$ in the circuitry of FIG. 1 may be replaced by a circuit like the one shown in FIG. 5, for example, which permits the point $P_1$ to be selectively connected to the point $P_2$ or $P_3$ by the medium of a switch $S_7$ serving exclusively for turning on the large lamps, so that the switch $S_7$ upon contact with the point $P_2$ produces an operation entirely the same as that obtained by use of the circuit illustrated in FIG. 1 and the same switch, when turned to contact with the point $P_3$, establishes an electric continuity to the large lamps through the points $P_1$ and $P_2$ even after the changeover swtich $S_{5b}$ has been turned to the side for turning off the large lamps.

The preferred embodiments have so far been described as involving an illumination system adapted so that the lighting of the small lamps is obtained upon the extinguishing of the large lamps. A simple modification made in the circuit gives the system a change of operation such that the small lamps are kept on not only when the large lamps are off but also when they are on. Such a modification can be effected with the device of this invention, for example, when in the changeover switch for the illumination system, an electrical connection is made between the contact L and the contact S of the circuit switch $S_{1c}$ and, at the same time, the OFF side of the switch $S_{5b}$ for the large lamps (the circuit formed through the ON contact for the small lamps, in the case of the present preferred embodiment) is opened, namely, the line $C_S$ is removed.

Further, the lock engaging means which serves to keep the pedal lever of foot brake in its locked state need not be in the form of a separate member like the arm receiving plate but may be constituted by the pedal lever itself with the locking means adapted to exert depression upon the lever.

As described in detail above, the device for maintaining a stopped vehicle in braked condition according to this invention is highly advantageous in respect that it combines the safety guaranteed by perfect locking of the foot brake and the great economy and convenience issuing from the simultaneity of brake operation and illumination switch.

What is claimed is:

1. A device for maintaining a stopped vehicle in braked condition, which device comprises a foot brake provided with lock-engaging means, locking means adapted to come into engagement with said lock-engaging means while said foot brake is in its depressed position and thereby allow the foot brake to be retained in said depressed position, lock-actuating means serving to set said locking means selectively into its locked position or released position and headlight-switching means incorporated in appropriate portions of the circuit for said headlights and adapted to open said circuit upon detection of the fact that the locking means is in its locked position or close said circuit upon detection of the fact that the locking means is in its released position.

2. The device for maintaining a stopped vehicle in braked condition according to claim 1, wherein the lock engaging means is a receiving plate fastened to the pedal lever of the foot brake and extended toward the locking means and the locking means is an arm-shaped member, whereby the state of lock due to the engagement of the locking means and the lock engaging means is effected by having the arm-shaped member brought to rest upon the upper surface of the receiving plate and the state of release is effected by having the arm-shaped member separated from the receiving plate.

3. The device for maintaining a stopped vehicle in braked condition according to claim 1, wherein the means for operating the locking means so as to set the arm-shaped member selectively to the locked position or released position is a reversibly rotary electric motor, the arm-shaped member is fastened to the rotary shaft of said motor so as to produce a reciprocating motion within the range of an angle of rotation between the locked position and the released position and the circuitry for the device incorporates a circuit adapted to permit the reversibly rotary electric motor to be selectively rotated.

4. The device for maintaining a stopped vehicle in braked condition according to claim 2, wherein the mechanism for actuating the locking means comprises a pair of solenoid means composed of a locking solenoid and a releasing solenoid, whereby the arm-shaped member produces a reciprocating motion between the locked position and the released position by being selectively moved by said solenoids.

5. The device for maintaining a stopped vehicle in braked condition according to claim 4, wherein the arm-shaped member is caused by the locking and releasing solenoids to make a rotary reciprocating motion selectively between the locked position and the released position through the medium of a rack-pinion gear.

6. The device for maintaining a stopped vehicle in braked condition according to claim 4, wherein the arm-shaped member is caused by the locking and releasing solenoids to make a linear reciprocating motion selectively between the locked position and the released position under a magnetic force.

7. The device for maintaining a stopped vehicle in braked condition according to claim 2, wherein the receiving plate comprises a receiving unit adapted to permit direct mounting of the arm-shaped member thereon and a base fastened to the pedal lever and said receiving unit is joined to the base through the medium of a hinge so as to produce a free upward motion with the hinge as a fulcrum.

8. The device for maintaining a stopped vehicle in braked condition according to claim 1, wherein there is provided a changeover switch for illumination which permits the circuit incorporating the means for turning on and off the headlights to be selectively connected to a power source.

9. The device for maintaining a stopped vehicle in braked condition according to claim 1, wherein a circuit permitting the lighting of the headlight and a circuit permitting the lighting of auxiliary lamps are provided in parallel arrangement so that said changeover switch for illumination enables the two circuits to be selectively connected to the power source.

10. The device for maintaining a stopped vehicle in braked condition according to claim 9, wherein the means for turning on and off the headlights is adapted so that it breaks power source connection to the circuit permitting the lighting of the headlights and makes power source connection to the circuit permitting the lighting of the auxiliary lamps when it has detected the assumption of the locked state by the locking means while the changeover switch for illumination keeps an electrical connection between the circuit permitting the lighting of the headlights and the power source.

11. The device for maintaining a stopped vehicle in braked condition according to claim 1, wherein the means for turning on and off the headlights comprises limit switches and incorporates additionally therein a changeover switch permitting the forced extinguishing of the headlights even during the presence of a power source connection to the circuit permitting the lighting of the headlights, whereby while the locking means remains in its released position, power source connection is made to the circuit permitting the lighting of the headlights by the departure of the working piece of the locking means and, while the locking means remains in its locked position, power source connection to said circuit is broken by the collision of the working piece of the locking means against the relevant limit switch.

12. The device for maintaining a stopped vehicle in braked condition according to claim 1, wherein there is additionally incorporated means adapted to nullify the means for turning on and off the headlights.

* * * * *